United States Patent
Yariv

(10) Patent No.: US 6,178,233 B1
(45) Date of Patent: Jan. 23, 2001

(54) SYSTEM AND METHOD FOR OFF-LINE NOTIFYING A NETWORK USER

(75) Inventor: Eran Yariv, Haifa (IL)

(73) Assignee: NetGong Ltd, Nesher (IL)

(*) Notice: Under 35 U.S.C. 154(b), the term of this patent shall be extended for 0 days.

(21) Appl. No.: 08/925,075

(22) Filed: Sep. 8, 1997

(30) Foreign Application Priority Data

Jul. 30, 1997 (IL) .......................................................... 121427

(51) Int. Cl.[7] .................................................. H04M 11/00
(52) U.S. Cl. ................................... 379/93.24; 379/106.01
(58) Field of Search ............................ 379/93.24, 93.23, 379/93.17, 88.12, 88.13, 102.01, 102.02, 373, 142, 93.01, 90.01

(56) References Cited

U.S. PATENT DOCUMENTS

| 4,969,186 | * | 11/1990 | Sayre, II ........................ 379/88.11 |
| 5,138,653 | | 8/1992 | Le Clercq . |
| 5,742,905 | | 4/1998 | Pepe et al. . |
| 5,754,628 | * | 5/1998 | Bossi et al. ................... 379/102.02 |
| 5,802,166 | * | 9/1998 | Garcia et al. .................... 379/88.12 |
| 5,841,850 | * | 11/1998 | Fan ................................... 379/93.23 |
| 5,956,486 | * | 9/1999 | Hickman et al. ............... 379/93.24 |

FOREIGN PATENT DOCUMENTS

| 508138 | 10/1992 | (EP) . |
| 736989 | 10/1996 | (EP) . |
| 836301 | 9/1997 | (EP) . |
| 798899 | 10/1997 | (EP) . |
| WO 98/32274 | 7/1998 | (WO) . |

* cited by examiner

Primary Examiner—Stella Woo
(74) Attorney, Agent, or Firm—Eitan, Pearl Hatzer & Cohen Zadak

(57) ABSTRACT

A system and a method for indicating to the subscriber of a network, which subscriber is not continually connected to the network host facility, of the existence of a reason for initiating such a connection. A computer device is connected to the host facility and adapted for generating an indication signal addressed to the subscriber. A system modem is interconnected between a telephone communication link and the computer device so as to be responsive to the indication signal for generating an outgoing call and transmitting thereof to a subscriber modem associated with the subscriber. A counter means is associated with at least one of the modems and responsive to the outgoing call for disabling one of the modems after a predetermined period of time.

6 Claims, 5 Drawing Sheets

SYSTEM AND METHOD FOR OFF-LINE NOTIFYING A NETWORK USER

FIELD OF THE INVENTION

The present invention relates to a computer communication technique, particularly useful for indicating to a network user to contact a host facility of the network.

BACKGROUND OF THE INVENTION

Computers networks are known systems which are widely used. It is not an exaggeration to say that almost every personal computer (PC) is the node of at least one computer network. Methods of providing a network user with an automatic notification from the network server are also known and used especially for notifying a subscriber of the receipt of messages, addressed to the subscriber and which are stored in an electronic mail block of the server. To this end, a successful notification requires that the subscriber's PC be continually connected to the network server, i.e. be in a so-called 'on-line' mode of operation.

A system of this kind is disclosed, for example, in U.S. Pat. No. 5,138,653. The system comprises a microprocessor and a random access memory connected to an electronic mail system for receiving data items which identify the queuing messages. The access memory is organized so as to form a file containing codes which identify predetermined addresses of subscribers to whom messages are to be sent and data items representing the telephone numbers of these addresses. The system also comprises a modem connected to a telephone line for extracting the telephone number data items from the file and automatically dialing the telephone numbers of the addresses in order to transmit call signals to the respective subscriber through the telephone line. The microprocessor reads the queuing file of the messages, detects the presence of the identification codes residing in the file for extracting from the file the telephone number data item corresponding to each identification code detected, and instructs the modem to dial automatically the corresponding call numbers. Thus, the addresses of received messages are notified immediately by telephone of the receipt of these messages and quickly receive the latter without the need for special stand-by.

It will be appreciated that such 'on-line' connection to the network server results in the following two limitations for the user:

1) telephone bill derived according to the call tariff and duration of the call;

2) the availability of the telephone line is compromised because most users do not have a dedicated computer phone line and are thus occupying the main home line during the connection.

Moreover, in the case of such a network as so-called 'INTERNET' which is also known and widely used, an additional bill would be received from the Internet Service Provider, which bill is also derived from the respective call tariff and duration.

Another problem that exists today is the relatively complex set of operations a user has to perform to work on-line. Indeed, the user has to connect, operate the specific application to obtain the required information, and disconnect. All these operations are semi-manual in today's popular home operation systems such as, for example, MS-Windows. Novice users regard the on-line processes such as, for example, checking mail as cumbersome and error prone because of the lines being busy or/and owing to slow responses times, etc. Even advanced users regard the on-line processes as a nuisance and try to automate them as much as possible, for example, by using scripts, automatic dialers, etc.

A system for mail notification has been developed and disclosed in European Patent Publication No. EP 0 736 989. The system comprises a host computer and subscriber computers, wherein the subscriber computers are not connected to each other and/or the host computer. Messages are sent from a 'sender' subscriber to a 'recipient' subscriber via the host computer which is adapted for storing mail addressed to subscribers in individual mail boxes. The host computer is adapted for calling a phone associated with the recipient subscriber through a dialing unit whenever a new message arrives at the host computer. The dialing unit is connected through a telephone line, or a public telephone network to a receiving unit located at the recipient's side. The receiving unit is a specific hardware unit which is either stand alone, or a constructional part of the recipient's PC. Even in such a case that the recipient himself directly contacts the dialing unit through a conventional modem coupled to or installed in his PC, a notification arrives all the same to the receiving unit. More specifically, a notification enters a call intercept unit which is integral with the receiving unit. The receiving unit identifies that the phone call has been sent by the dialing unit of the host computer. A dedicated display device must be associated with the receiving unit for indicating to the subscriber that a notification has been received. It is thus evident that the disclosed system requires, in addition to specific hardware accommodated at the host computer's side, the provision of additional hardware at each subscriber's side.

Additionally, it is often the case that a subscriber, even being in a so-called 'off-line' mode of operation needs to be automatically informed that the network server has been updated with a specific information of interest to the subscriber since his/her last connection. This information may be supplied to the network server by either another subscriber or specific data base commonly connected to the server. Alternatively, the case may be such that one subscriber needs to be connected to another subscriber through one or more network servers. In this case, the other subscriber, who may not be currently connected 'on-line' to the associated server should be informed that the specific subscriber desires to contact him.

SUMMARY OF THE INVENTION

It is thus a major object of the present invention to overcome the above listed and other disadvantages of the conventional systems and provide a method and a system for off-line indicating to the subscriber of a network to contact the network host facility.

There is thus provided according to a broad aspect of the present invention a system for indicating to the subscriber of a network, which subscriber is not continually connected to the network host facility, of the existence of a reason for initiating such a connection, the system comprising:

(a) a computer device connected to said host facility and adapted for generating an indication signal addressed to said subscriber;

(b) a system modem interconnected between a telephone communication link and said computer device so as to be responsive to said indication signal for generating an outgoing call and transmitting thereof to a subscriber modem associated with said subscriber; and (c) a counter means associated with at least one of the modems and responsive to said outgoing call for disabling said one modem after a predetermined period of time.

The indication signal is representative of the existence in the host facility of a predetermined data addressed to the subscriber. The predetermined data may be a message generated by another subscriber of either the same network or any other network having its host facility connected to said host facility. The predetermined data may be a message generated by the host facility in accordance with the network protocol associated with the subscriber.

The system modem comprises an identification means for identifying the subscriber. The system modem, preferably, comprises a plurality of modems and a multichannel communication port so as to be adapted for an automatic call distribution.

The subscriber comprises at least one personal computer having software for executing an additional protocol between the personal computer and the computer device. The subscriber modem may be responsive to the outgoing call for generating an incoming call and transmitting thereof to the subscriber. The subscriber modem may also comprise an identification means for identifying the computer device.

The counter means may be associated with the subscriber and responsive to the incoming call for operating the subscriber modem for transmitting the incoming call during a predetermined period of time. The counter means associated with the subscriber may be responsive to an outgoing call generated by the subscriber modem for detecting whether or not the subscriber modem received the outgoing call generated by the system modem within a predetermined period of time.

According to another aspect of the present invention there is provided a method for indicating to the subscriber of a network, which subscriber is not continually connected to the network host facility, of the existence of a reason for initiating such a connection by means of a system interconnected between said host facility and a subscriber unit associated with said subscriber, the method comprising the steps of:

at said subscriber unit:
   (i) generating an inquiry signal addressed to said host facility; and
   (ii) providing an outgoing call indicative of an existence of said inquiry signal;

at the system:
   (iii) receiving said outgoing call and identifying said subscriber unit;
   (iv) upon successful identification, connecting with the host facility for detecting whether or not there exists in said host facility data associated with said inquiry signal of said subscriber;
   (v) upon detecting the existence of said data, providing an indication signal addressed to the subscriber.

Preferably, the outgoing call provided by the subscriber unit is transmitted during a predetermined period of time.

The method may also comprise the step of receiving by the subscriber unit an incoming call from the system within a predetermined period of time, and providing an indication thereof to the subscriber.

The step of providing the indication signal may comprise the steps of:

at the system
   generating an outgoing call and transmitting to the subscriber; and
   disabling the outgoing call after a predetermined period of time which is insufficiently long to allow a connection to be effected between the host facility and the subscriber unit.

The method may further comprise the step of:

at the subscriber
   upon receiving the outgoing call from the system within a predetermined period of time, providing an indication thereof to the subscriber.

According to still another aspect of the present invention there is provided a method for indicating to the subscriber of a network, which subscriber is not continually connected to the network host facility, of the existence of a reason for initiating such a connection by means of a system interconnected between said host facility and a subscriber unit associated with said subscriber, the method comprising the steps of:

at said system:
   (1) periodically initiating a contact with the host facility for detecting whether or not there exists in the host facility a predetermined data addressed to the subscriber unit, and
   (2) upon detecting the existence of the data generating an outgoing call addressed to the subscriber unit;
   (3) transmitting said outgoing call to the subscriber unit; and
   (4) disabling said outgoing call after a predetermined period of time which is insufficiently long to allow a connection to be effected between the host facility and the subscriber unit at the subscriber unit:
   (5) receiving said outgoing call by said subscriber unit and identifying said system; and
   (6) upon successful identification, generating a respective incoming call and transmitting thereof to the subscriber unit.

More specifically the present invention is used with the "INTERNET" and is, therefore, described further below with respect to this application.

BRIEF DESCRIPTION OF THE DRAWINGS

In order to understand the invention and to see how the same may be carried out in practice, several preferred embodiments will now be described, by way of non-limited example only, with reference to the accompanying drawings, in which.

DETAILED DESCRIPTION OF THE PREFERRED EMBODIMENTS

Figure 1:
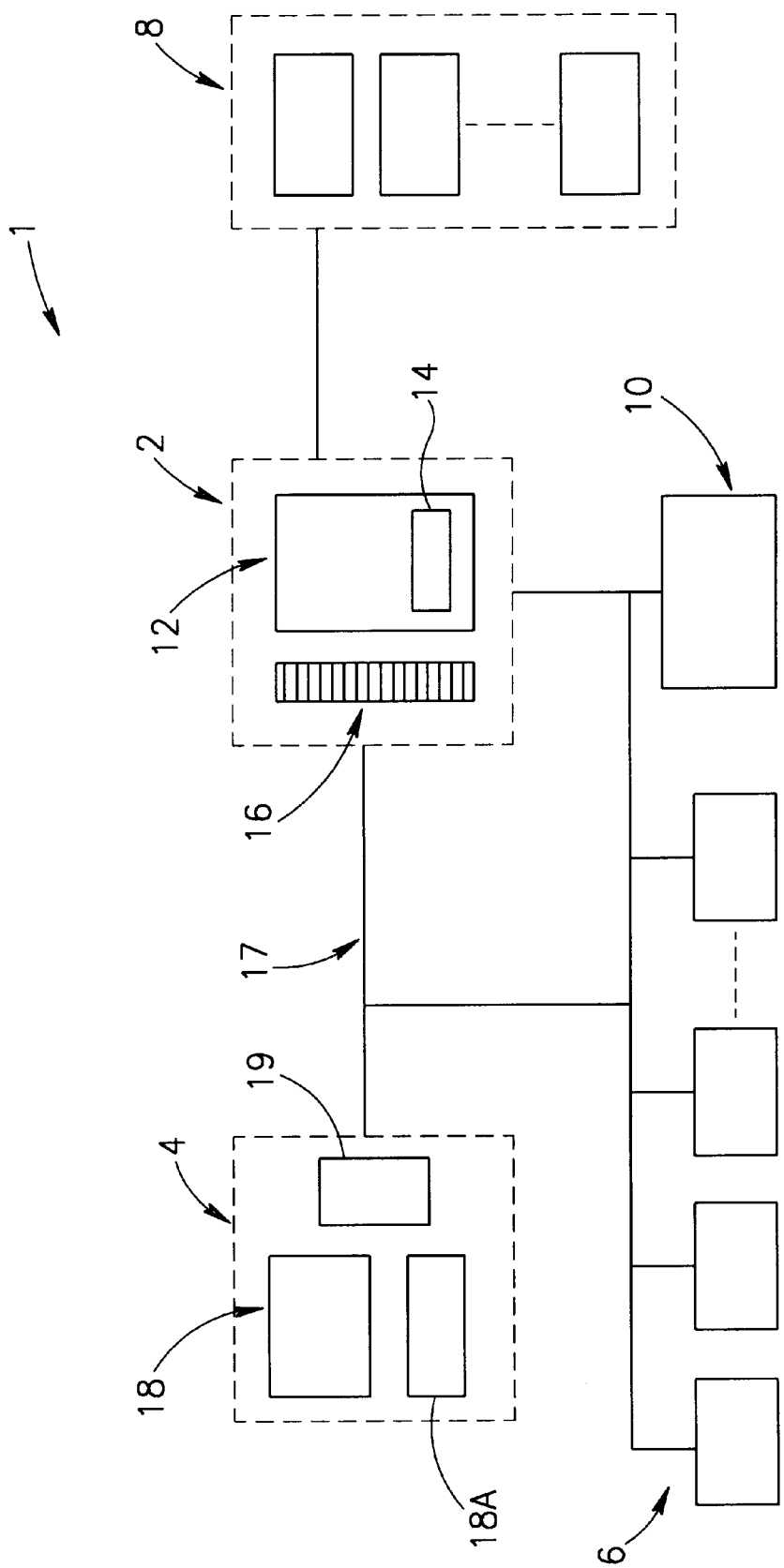
FIG. 1 is a block diagram illustrating the main components of a conventional computer network.

In order to more clearly illustrate unique feature of the present invention, it would be reasonable to consider a conventional computer network shown in FIG. 1 and generally designated 1. The network 1 comprises a host facility side 2 which is interconnected between a plurality of subscribers' sides at different remote locations, of which one subscriber side 4 is specifically shown and the other subscribers' sides are generally denoted 6. In the case of such a network as the "INTERNET", the host facility 2, i.e.

so-called Internet Service Provider (ISP), is further connected to another plurality of similar remote located ISPs, generally at 10, so as to be connected therethrough to various data bases (not shown) for receiving various kinds of information and transmitting an associated data to the subscribers in reply to their inquiries. The ISP's side 2 is further optionally connected to a data base, or plurality of such data bases, generally at 8.

The ISP's side 2 typically includes a computer 12, or a plurality of computers, which is provided with a memory 14 for storing a reference data representative of all registered subscribers each having respective subscriber units 4 and 6. The data is in the form of appropriate identification codes including electronic mail addresses of the subscribers. Coupled to the computer 12 is a conventional modem 16 (constituting a system modem) connected to a communication link 17, such as, for example, public or private telephone networks, through a multichannel communication port, which is not specifically shown, so as to be adapted for automatic call distribution. The modem 16 receives and transmits incoming and outgoing calls. To this end, it is of a so-called "MODEM POOL" kind, i.e. comprises a lot of modems having a Caller ID detection feature so as to identify the subscriber who has generated the incoming call. All these functional parts of the conventional ISP's side 2 are well known per se and, therefore, need not be more specifically described.

The subscriber unit 4 typically comprises a personal computer (PC) 18 having a display 18a, or a plurality of such PCs (not shown) connected by a local area network (LAN). Coupled to the PC 18 is a modem device 19 (constituting a subscriber modem) which may be of any known kind. In order to receive information such as, for example, a signal indicating of the existence of a message addressed to the subscriber unit 4, the latter should contact the ISP side 2 in a conventional manner, namely through the telephone communication link 17 in accordance with a previously established protocol between the ISP and the specific subscriber. To this end, the PC 18 is conventionally provided with a software program, so-called 'Client', to be executed for 'on-line' contacting the ISP and obtaining a required data therefrom in accordance with the protocol. Upon initiating such an 'on-line' connection, the subscriber immediately receives a notification of the receipt of messages, if any, which notification usually appear as a visual message on the display 18a. Obviously, a vocal message may be additionally provided. It is appreciated that the notification relates to those messages which have been received by the computer 12 since the last connection with the user 4. A similar procedure is executed by the subscriber unit 4 in order to connect to the other subscriber unit 6 for sending a message thereto. All these functional features of subscriber unit are also well known per se.

Figure 2:
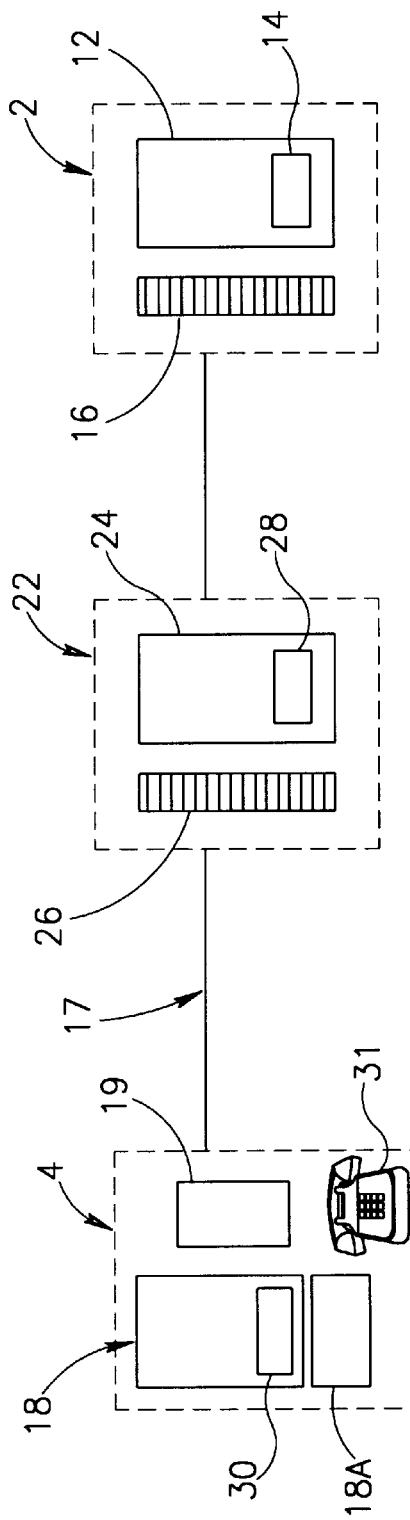
FIG. 2 is a block diagram illustrating the main components of a system for establishing a communication between the host facility of a network and a subscriber thereof, according to one embodiment of the invention.

FIG. 2 illustrates a system, generally designated 20, which is constructed and operated in accordance with one preferred embodiment of the present invention. The same reference numbers are used for indicating those parts which are common for the conventional system 1 and the system 20 in order to facilitate understanding. The system 20 presents connection between the ISP 2 and the subscriber unit 4 through the telephone communication link 17. To this end, the subscriber unit 4 typically includes at least one telephone device 31.

One of the essential features of the present invention is the provision of a sub-system 22 interconnected between the communication link 17 and ISP 2. The sub-system 22 comprises a computer 24 coupled to a modem 26 which is constructed and operated similarly to that of the ISP 2 for providing, on the one hand a connection between the sub-system 22 and the subscriber unit 4 and, on the other hand, between the sub-system 22 and the ISP 2. The sub-system 22 and the subscriber unit 4 are respectively provided with counter utilities 28 and 30. The counter utilities 28 and 30 are known means typically comprising an appropriate software which can be easily installed in a personal computer of any known configuration. According to the present example, such a counter controls the following two processes:

1) a process of dialing the other side, i.e. transmitting an outgoing call by means of waiting a predetermined period of time, or a predetermined number of rings, and then hanging-up; and 2) a process of receiving an incoming call by means of waiting a predetermined period of time, or a predetermined number of rings, and then hanging-up.

The counters 28 and 30 are thus adapted for disabling the host facility and the subscriber unit respectively after a predetermined time period which is set to be sufficiently short as to prevent a connection between the host facility and the subscriber unit being affected.

Figure 3:
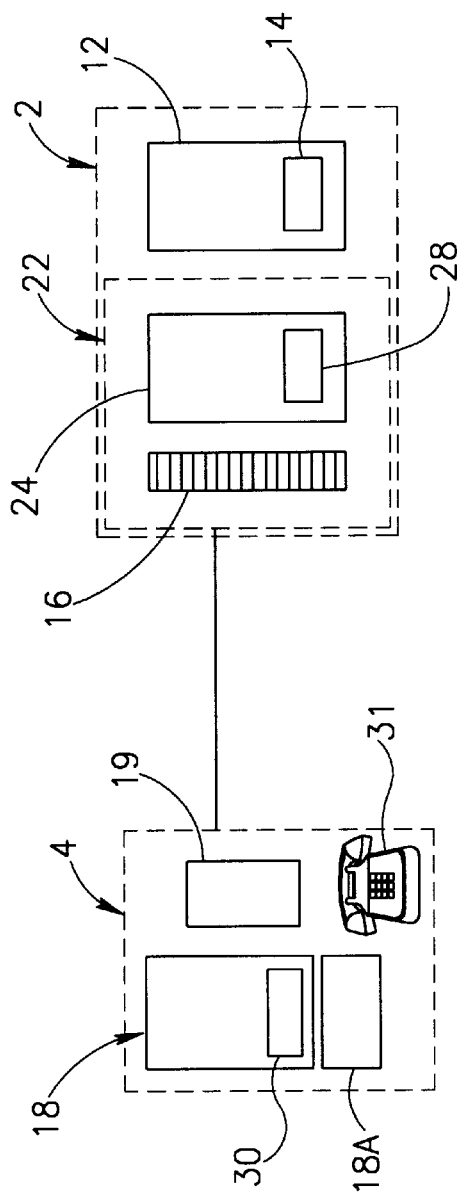
FIG. 3 is a block diagram illustrating the main components of a system according to another embodiment of the invention.

FIG. 3 illustrates an alternating example of a system 32 according to the invention. The system 32 is generally similar to the system 20 and differs from the latter solely in that the sub-system 22 is accommodated at the ISP 2 being directly coupled to the computer 12. To this end, the modem system 26 is replaced by the modem 16 of the conventional ISP side 2.

A subscriber (not shown) at the subscriber unit 4, in order to obtain an information of his/her interest from the ISP 2, queries the sub-system 22 either manually or automatically. This information is a data representative of the existence of an 'event' of his interest such as, for example, the receipt of messages addressed to the user, or updating of a specific data base as defined above.

Figure 4:
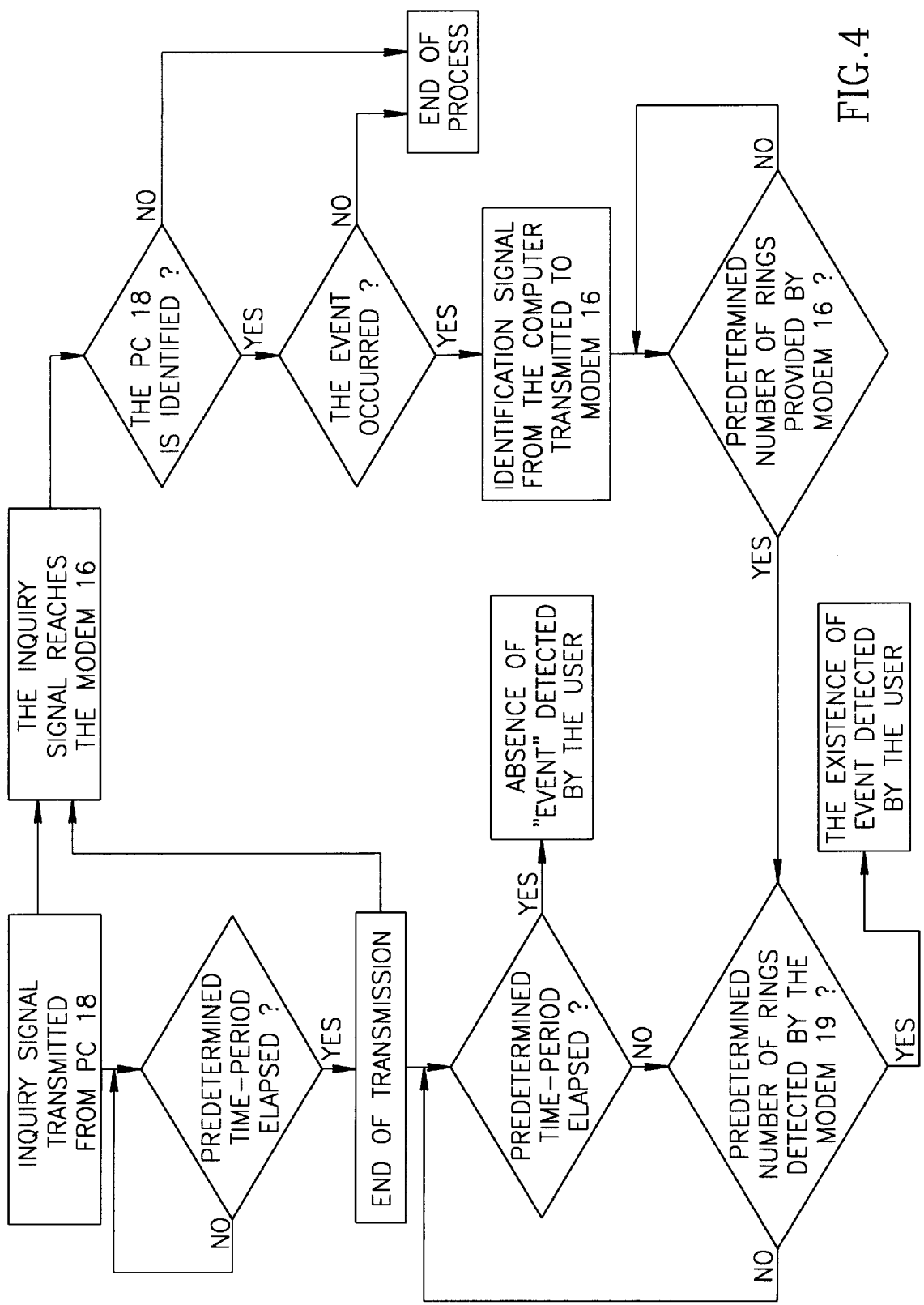
FIGS. 4 to 6 illustrate flow diagrams of the main principles of operation of the system of FIG. 3 in accordance with three different examples of a method according to the invention.

One example of operation of the system 32, so-called 'Bi-Directional Polling Mode' of operation, will now be described wit to FIG. 4. The subscriber 4, whose PC 18 is not continually connected to the ISP 2, such that his Client software is not executed, generates a query signal for ISP 2 in accordance with an additional protocol between the subscriber unit 4 and the sub-system 22, i.e. between the computers 18 and 24. The modem 19 converts this signal into an outgoing call and transmits the latter into the telephone communication link 17. The counter 30 operates in a manner to allow the outgoing call to be continuously transmitted, for example for a duration of two rings and, then, stop its transmission. It is appreciated that this predetermined number of rings may be changed, being chosen so as to be long enough for successfully accessing the remote location of the sub-system 22, but not sufficiently long to allow connection between the host facility and the subscriber unit. The modem 16 receives the call and, if the subscriber unit is identified by its Caller ID, the computer 24 'checks' its data base 14 so as to detect whether or not the above described 'event' takes place. If so, the computer 24 generates a signal indicating of the existence of the 'event' and transmits the signal to the modem 16. The modem 16 generates a respective outgoing call and transmits the same to the link 17. The counter 28 operates in a manner to allow the outgoing call be continuously transmitted for a predetermine number of rings, for example two rings. Meanwhile, the counter 30 of the subscriber unit 4 waits for any incoming call from the modem 19 during a preset period of time. Upon receipt of the incoming call by the subscriber unit, the telephone 31 starts to ring until a predetermined number of rings, two in the present example, which is controlled by the counter 30. The subscriber himself decides as to whether or not execute the Client software for 'on-line' connecting the ISP 2 and operates the computer 18 accordingly. In the absence of such an incoming call from the sub-system 22 during the predetermined time-period the counter 30 generates a respective signal indicating thereof. The additional protocol, therefore, assumes no 'event' has been occurred.

It will be readily understood that the provision of such sub-system 22 and additional protocol between the network subscribers and the sub-system 22 provide an advantage consisting in avoiding additional costs associated with the 'on-line' connection at least at the stage of checking whether or not there exists any reason for such connection.

Figure 5:
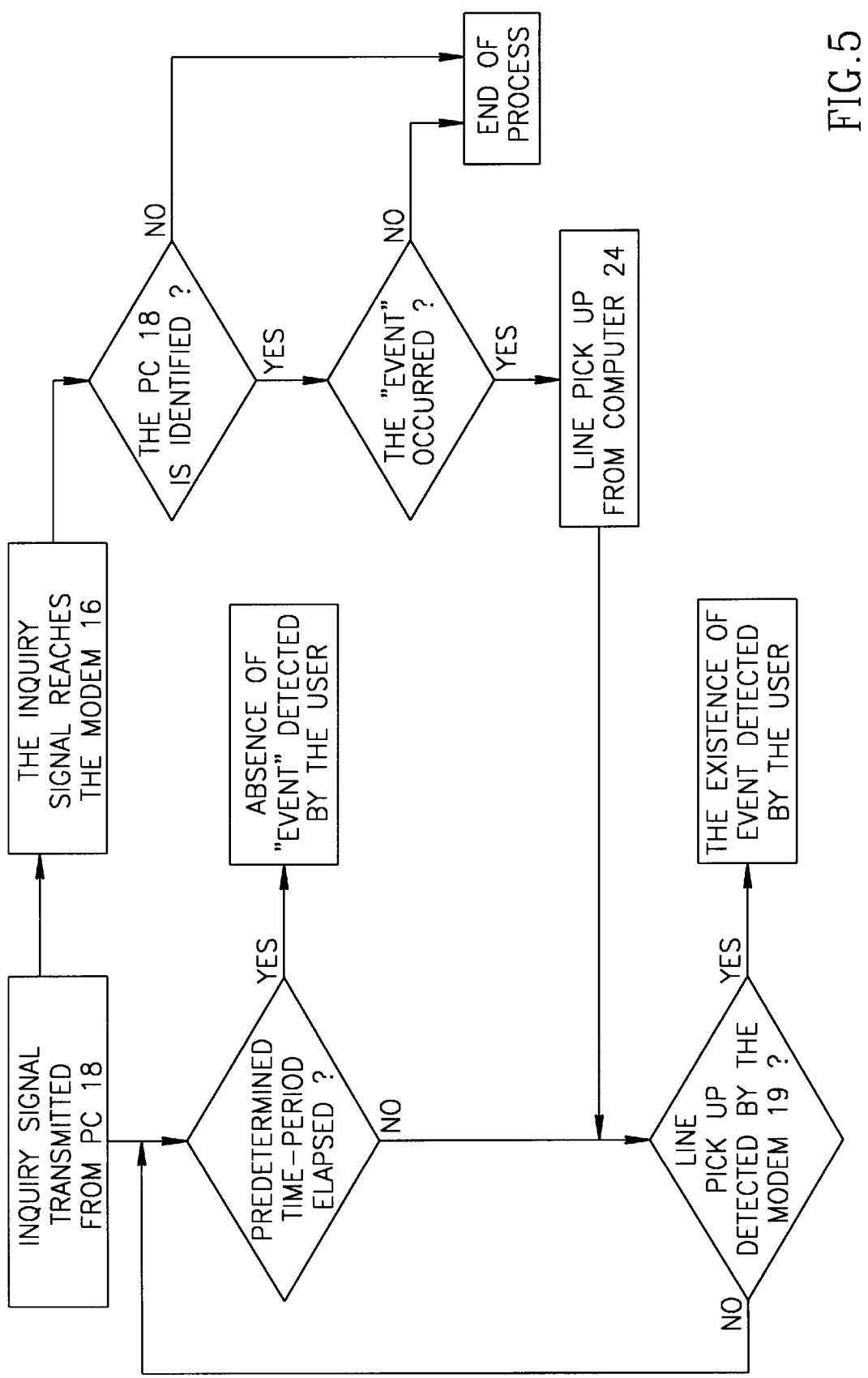

It is also appreciated that in order to avoid undesirable ringing at the subscriber unit, especially for the case when the computer 18 polls the sub-system 22 automatically, i.e. periodically, it may be benefit for the user to dial the sub-system 22 through 'toll free lines'. FIG. 5 self-explanatory illustrates a so-called 'Uni-Directional Polling Mode' of operation of the system 32. Upon detecting the existence of the 'event' at the ISP 2, the sub-system 22 picks up on the subscriber's ring so as to indicate of the same to the user. If the subscriber computer 18 detects the line pick up from the sub-system 22 within a predetermined period of time by means of the counter 30, it acts accordingly. Otherwise, the protocol assumes no 'event' exists.

Figure 6:
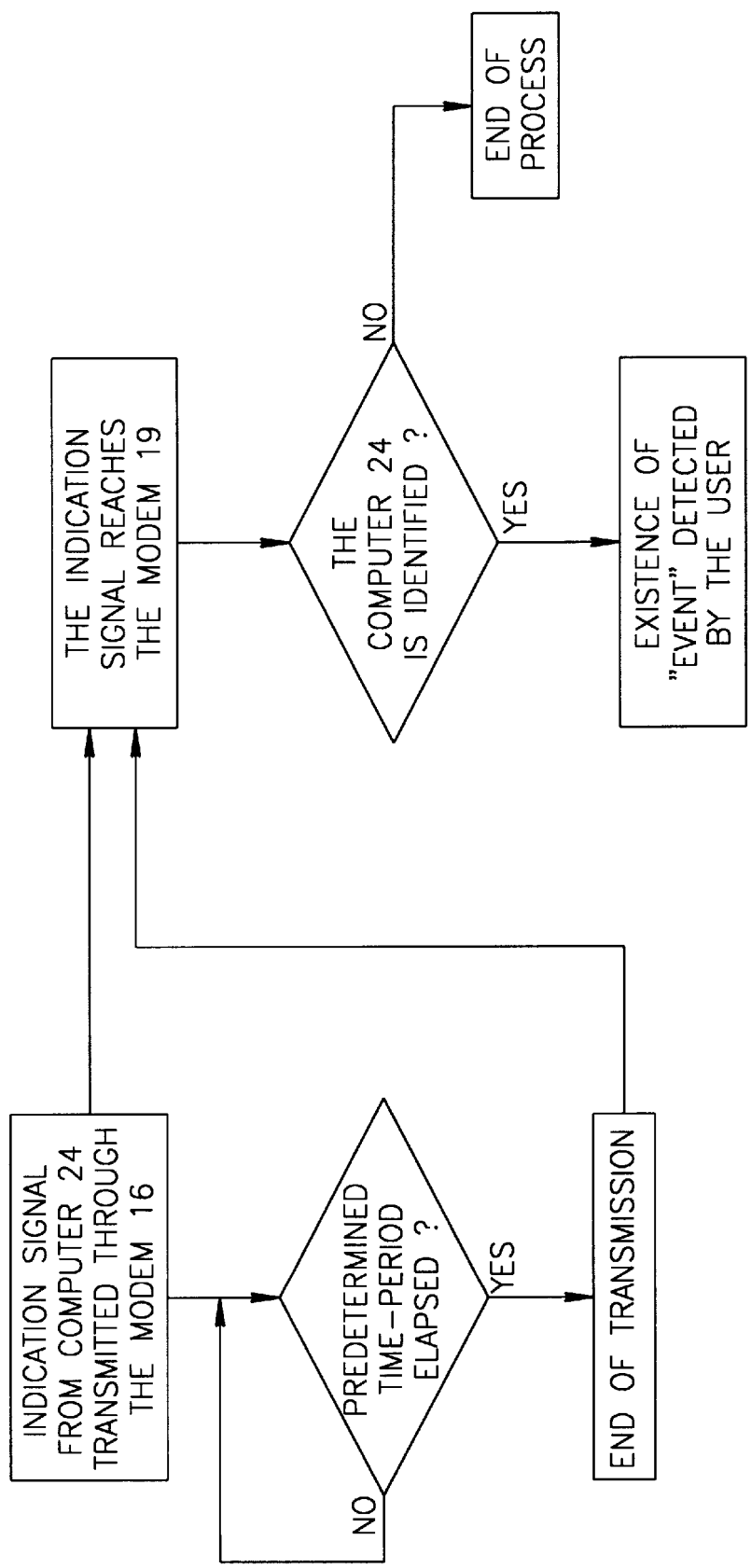

Reference is now made to FIG. 6 illustrating the main steps of operation of the system 32 according to another example, so-called 'Server Notification Mode' of operation. To this end, the sub-system 22 is preprogrammed for periodically contacting the computer 12 of the ISP 2 for 'checking' the existence of any 'event', defined by the additional protocol between the sub-system 22 and the specific subscriber, or vice versa the ISP 2 automatically updates the sub-system 22. Upon detecting the existence of the 'event', the computer 24 generates an indication signal representative thereof. The counter 28 operates in the above described manner for allowing the transmission of the respective outgoing call during a predetermined time-period. It is understood that according to this embodiment of the invention the modem 19 should be of a so-called 'Caller ID' kind.

It should be specifically noted that the case may be such that a first user associated with his local ISP needs to contact a second user associated with another remote located ISP. In such a case, due to the provision of the sub-system 22 at least at either ISP, the first user can reach the second user 10 through the local ISP and all other ISP, if any, interconnected between the local ISP and the remote ISP. The simplest example of such situation is that a user is located far from his own PC and needs to access a software application kept therein. The only two conditions which should be satisfied are as follows:

a switched-on mode of his PC;

access to any other computer which is the subscriber of any ISP.

Those skilled in the art will readily appreciate that many modifications and changes may be applied to the invention as hereinbefore exemplified without departing from its scope defined in and by the appended claims. In the method claims which follow, characters which are used to designate claim steps, are provided for convenience only and do not apply any particular order of performing the steps.

What is claimed is:

1. A method for providing an indication to a subscriber of a network, which subscriber is not continually connected to a network host facility, of an event at the network host facility, the method comprising the steps of:

at a subscriber unit:
generating an inquiry signal; and
generating an inquiry telephone call to said host facility responsive to said inquiry signal, and terminating said inquiry call after a predetermined call duration so as to prevent the on-line connection between the subscriber unit and the host facility;

at a system connectable to said host facility and said subscriber unit:
receiving said inquiry call and identifying said subscriber unit prior to the termination of said inquiry call;
upon successful identification of said subscriber unit, determining whether a event associated with said subscriber has occurred at the host facility; and, if so, providing an indication signal for the subscriber;
generating, responsive to said indication signal and within a predetermined period of time, a notification telephone call to a subscriber modem associated with a communication device of said subscriber;
terminating said notification call after a predetermined call duration so as to prevent on-line connection between said subscriber unit and said system; and at said subscriber unit;
determining whether said notification call was received within said predetermined period of time; and, if so,
generating a signal indicating the occurrence of said event.

2. A method according to claim 1 wherein said identifying step comprises identifying using caller ID.

3. A method according to claim 1 wherein said terminating step comprises terminating after a predetermined length of time.

4. A method according to claim 1 wherein said wherein said terminating step comprises terminating after a predetermined number of rings.

5. A method according to claim 2 wherein said terminating step comprises terminating after a predetermined length of time.

6. A method according to claim 2 wherein said wherein said terminating step comprises terminating after a predetermined number of rings.

* * * * *